UNITED STATES PATENT OFFICE.

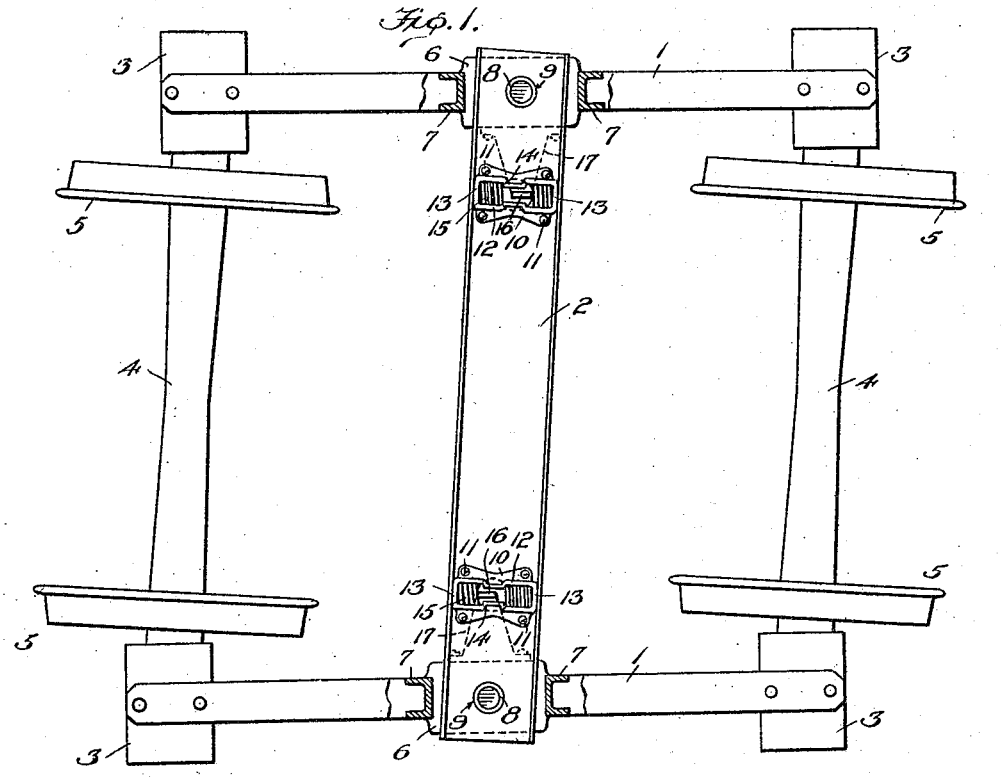

GUSTAF ARVID ANDERSON, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,916.         Specification of Letters Patent.      Patented May 2, 1922.

Application filed January 17, 1921. Serial No. 437,974.

*To all whom it may concern:*

Be it known that I, GUSTAF ARVID ANDERSON, a citizen of the United States, residing at Baltimore, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to an improved type of flexible car truck embodying transversely spaced side frame members which are normally retained in square relation opposite each other by resilient means permitting them to be temporarily displaced longitudinally of the truck so as to assume an out of square relation allowing the truck parts to be relieved from the deteriorating and destructive effects of forces applied to the truck as an incident of its passage around curves and as the result of inequalities in the track, such as projecting switch points, bad rail joints or other imperfections in the track or truck wheels. By my invention the flange wear of the wheels of a flexible truck is minimized and the wear of the rails is also decreased.

Generally stated, the principal object of my invention is to provide a simple, strong, compact and durable mechanism for yieldingly maintaining the side frame members of a truck in square relation which may readily be combined with truck side frames that are movably connected through a transversely extending connecting means in such manner that the said side frames may be displaced longitudinally of the truck from their normal relation.

Broadly regarded, these objects are accomplished by mounting one or more spring devices upon the means by which the side frame members are connected, and by rigidly securing to either or both of the side frames means for energizing said spring devices upon a relative longitudinal displacement of the truck frame members from normal.

There are advantageous features of the invention which reside in the particular form, arrangement and combination of parts, all as will hereinafter appear.

In the drawings illustrating the invention, the scope whereof is pointed out in the claims,—

Figure 1 is a view of a car truck, partly in plan and partly in horizontal section, embodying the invention, the truck bolster, which may be of the form ordinarily employed in flexible trucks, being omitted and the parts being illustrated in the angular relations they assume when passing around a sharp curve.

Figure 2 is a detail view, partly in plan and partly in horizontal section, showing the relation of one of the spring devices to a side frame and the cross connecting member of the truck, the parts being in the normal or square relation.

Figure 3 is a detail section on the line 3—3, Fig. 2, the rigid arm by which the associated spring device is energized upon longitudinal displacement of the adjacent truck frame from its normal position being shown in elevation.

Figure 4 is a detail section on the line 4—4, Fig. 2.

In the preferred form of my invention illustrated in the drawings, the spaced side frame members 1 of the truck are movably connected by transversely extending means 2 preferably constituting a truck spring plank. Each side frame is provided at its opposite ends with journal boxes 3 into which the journal ends of the axles 4 extend. 5 are the truck wheels.

The cross connecting member 2 preferably extends into the bolster openings 6 of the side frames between the columns 7, the space between the columns being sufficiently great to permit the cross connecting means to turn through the required angle corresponding to the relative longitudinal displacement from normal position which the side frame members 1 may be designed to have. If, as is the case illustrated in the drawings, a spring plank is employed to function as a cross connecting means, sufficient clearance is similarly provided for permitting the bolster to change its angular relation to the side frame members when the latter execute a relative movement longitudinally of the truck.

The spring plank 2 is preferably pivot ally connected to each of the side frame members 1. For this purpose each side frame may be provided with an upwardly extending pivot boss 8 which enters a correspondingly shaped opening or pivot bearing 9 in the spring plank.

The means for yieldingly resisting longitudinal displacement of the side frame members from their normal position preferably comprises a plurality of spring devices each of which is adapted to be individually energized by the longitudinal displacement of the side frame member adjacent which it is located. It will be obvious, however, that the duty of yieldingly restraining longitudinal departure of the side frame members 1 from their normal relation may be performed by a single spring device, since the restoration of the cross connecting member 2 to normal, even though enforced by a single spring device, will result in the return of both side frames to square position.

The spring devices may be conveniently mounted upon the upper side of the spring plank 2 in spaced relation with the side frame members and with each other. Each spring device preferably includes a frame member or housing 10 which is rigidly secured to the spring plank by means of rivets 11 and is provided with communicating spring pockets 12. Each of the spring pockets is formed at its opposite ends with spring abutments or shoulders 13, 13 and 14, 14, respectively, and receives between its abutments a spring 15 which extends longitudinally of the truck, the adjacent ends of said springs being spaced apart to permit the interposition of the upwardly extending arm 16 of an operating member 17 which is riveted or otherwise rigidly secured to the inner face of the adjacent side frame member 1 below the spring plank 2. If desired the springs 15 may be assembled under considerable initial compression.

To permit the arm 16 of the member 17 to extend upwardly and engage the ends of the springs 15 the spring plank 2 is slotted, as at 18, said slot being of sufficient length to allow for the desired extent of relative longitudinal displacement of the side frames 1. For a similar reason the spring housing 10 is slotted on its under side between the adjacent spring abutments 14 to accommodate the movements of the upwardly projecting portion 16 of the arm member 17, said slot 19 being extended and widened toward the ends of the housing to provide openings through which the springs 15 may be introduced. When the housing is secured to the spring plank 2 the openings through which the springs are introduced are closed, thus preventing escape of the springs. In order that the condition of the springs may be determined by inspection the side of the housing 10 which is exposed to view may be formed with a slot or aperture 20 through which the springs may be observed. The aperture 20 should be of less width than the diameter of the springs, thus insuring the retention of the springs in place in the housing.

A truck embodying my invention constructed in the form herein described will operate in the following manner when either of the side frames 1 is displaced longitudinally of the truck from its normal position: The relative longitudinal displacement of the side frames causes the transverse connecting means 2 to change its angular relation to said side frames. The spring actuating devices or arm members 17 which are rigidly attached to the respective side frames consequently move with respect to the spring devices which are mounted upon the spring plank 2. The movement of the spring operating devices thus causes one of the longitudinally extending springs 15 of each spring mechanism to be compressed to an extent corresponding to the displacement of the adjacent side frame member 1 from its normal position. When the extraneous force acting upon the truck to induce relative longitudinal displacement of the side frames from their normal position ceases to act the springs 15 which have been compressed thereupon expand and in so doing by pressing against the corresponding upwardly projecting portion 16 of the member 17 force the side frame members 1 to reassume their normal relation. If the truck is forced out of square in the opposite direction the springs 15 which before were inactive will be energized in a manner similar to that heretofore described, and upon expanding will operate to restore the side frames to normal relation.

Throughout the specification I have referred to the cross connecting member 2 as a spring plank, but it will of course be understood that this cross connecting member is merely a cross connecting means and not necessarily a spring plank, although it may advantageously perform the function of such an element.

I claim:—

1. In a car truck, the combination with side frame members which are relatively movable longitudinally of the truck, of means for connecting said side frame members, a spring device mounted on said connecting means between said side frame members, and means rigidly secured to one of said side frame members for energizing said spring device by a longitudinal displacement of said frame member from normal position.

2. In a car truck, the combination with side frame members which are relatively movable longitudinally of the truck, of means extending crosswise of the truck for connecting said side frame members, a spring device mounted upon said connecting means between said side frame members and in spaced relation thereto, and an arm rigidly secured to one of said side frame members and projecting inwardly therefrom for energizing said spring device by a longitudinal displacement of said arm from normal position.

3. In a car truck, the combination with side frame members which are relatively movable longitudinally of the truck, of a spring plank movably connected to said side frame members, a spring device arranged above said spring plank, and means rigidly secured to one of said side frame members for energizing said spring device by a longitudinal displacement of said side frame member from normal position.

4. In a car truck, the combination with side frame members which are relatively movable longitudinally of the truck, of means for movably connecting said side frame members, a spring device arranged between said side frame members and movable by said connecting means, and means movable with one of said side frame members and rigidly connected thereto below said connecting means for energizing said spring device by a longitudinal displacement of said side frame member from normal position.

5. In a car truck, the combination with side frame members which are relatively movable longitudinally of the truck, a spring plank pivotally connected to said side frame members, a spring device movable with said spring plank, and means rigidly connected to one of said side frame members and projecting inwardly therefrom below said spring plank for energizing said spring device by a longitudinal displacement of said side frame member from normal position.

6. In a car truck, the combination with side frame members which are relatively movable longitudinally of the truck, of a spring extending longitudinally of said truck in spaced relation to said side frame members, means independent of said spring for movably connecting said side frame members, and means for energizing said spring by a longitudinal displacement of one of said side frame members from normal position, said spring being supported by said connecting means and located intermediate the ends of said side frame members.

7. In a car truck, the combination with spaced side frame members, of means for connecting said frame members, said means being adapted to permit a relative longitudinal separating movement of said frame members, and yielding means extending longitudinally of the truck and spaced inwardly from said frame members intermediate the ends thereof and adapted to restore the said frame members to normal position after a longitudinal displacement of either of said frame members.

8. In a car truck, the combination with transversely spaced side frame members which are relatively movable longitudinally of the truck, of a spring plank pivotally connected to said side frame members, and means arranged longitudinally of said truck and located above said spring plank for yieldingly resisting the longitudinal movement of either frame member from normal position.

9. In a car truck, the combination with side frame members which are relatively movable longitudinally of the truck, and a cross connecting member, of longitudinally disposed means for yieldingly resisting longitudinal displacement of either side frame member with reference to the other side frame member, said means being mounted upon said connecting member and being spaced from said side frame members.

10. In a car truck, the combination with side frame members which are relatively movable longitudinally of the truck, of means extending transversely of the side frame members for connecting the latter, and yielding means disposed longitudinally of the truck and spaced from said side frame members and mounted upon said connecting means, said yielding means being adapted to be energized by a longitudinal movement of either side frame from normal position.

11. In a car truck, the combination with side frame members which are relatively movable longitudinally of the truck, of means extending transversely of said side frame members for connecting the latter, a plurality of spring devices spaced transversely of the truck and mounted upon said connecting means, and means rigidly connected to the respective side frame members for independently energizing the respective spring devices.

12. In a car truck, the combination with side frame members which are relatively movable longitudinally of the truck, of means for movably connecting said side frame members, a plurality of springs mounted upon said connecting means, said springs extending longitudinally of the truck and being spaced transversely thereof, and means for energizing said springs by a relative longitudinal displacement of said side frame members from normal position.

13. In a car truck, the combination with side frame members which are relatively movable longitudinally of the truck, a spring plank pivotally connected to each of said side frame members, a plurality of transversely spaced spring abutment members carried by said spring plank, spring means extending longitudinally of said truck and respectively cooperating with said abutment members, and means rigidly connected to the side frame members adjacent said spring plank for independently energizing the respective spring means upon a relative longitudinal displacement of said side frame members.

14. In a car truck, the combination with side frame members which are relatively movable longitudinally of the truck, of a spring plank movably connected to said side frame members, and means for yieldingly resisting relative longitudinal displacement of said side frame members from normal position, said means including a spring and a housing for the latter, said housing being adapted to be attached to said spring plank and having an opening permitting the introduction of said spring, said spring plank extending across said opening to prevent escape of said spring from said housing.

15. In a car truck, the combination with side frame members which are movable longitudinally of the truck, of a transversely extending member for connecting said side frame members, a spring housing connected to said transversely extending member, said housing having a plurality of spring pockets each provided with spring abutments at their opposite ends, the adjacent abutments being slotted, a spring located in each pocket, and means connected to one of said side frame members and having a portion adapted to extend within said slot for alternately energizing said springs upon a longitudinal displacement of either of said side frame members from normal position.

16. In a car truck, the combination with side frame members which are relatively movable longitudinally of the truck, of a spring plank extending crosswise of the truck and movable with respect to said side frame members, spring means mounted upon the upper side of said spring plank, and means for energizing said spring means through relative longitudinal displacement of said side frame members from normal position, said last named means involving a device rigidly secured to one of said side frame members below said spring plank and extending upwardly above the bottom of said spring plank to engage and actuate said spring means.

In testimony whereof I affix my signature.

GUSTAF ARVID ANDERSON.